Figure 1:
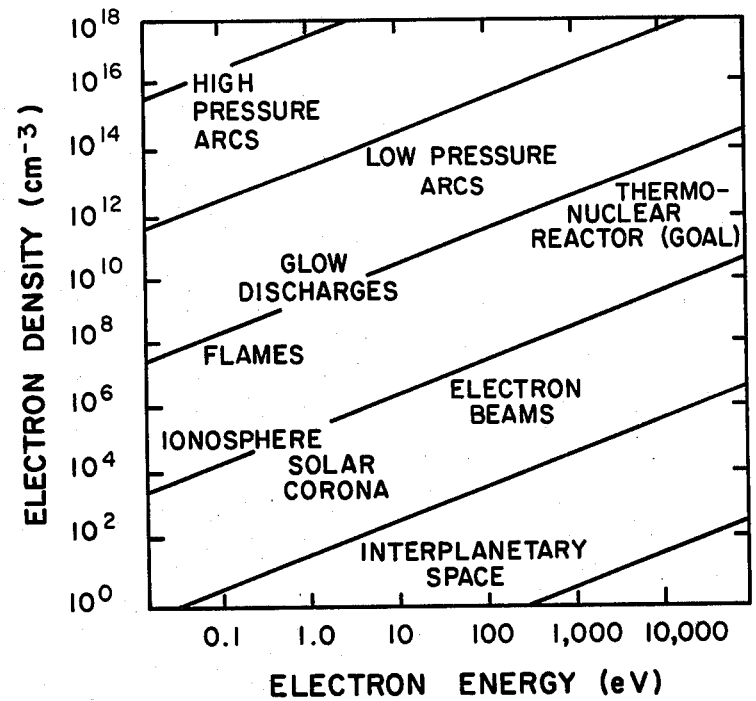

United States Patent [19]

Blenner et al.

[11] 4,374,694
[45] Feb. 22, 1983

[54] METHOD FOR BONDING ELASTOMERS TO METALS

[75] Inventors: Donald R. Blenner; Herman V. Boenig, both of Erie, Pa.

[73] Assignee: Lord Corporation, Erie, Pa.

[21] Appl. No.: 276,450

[22] Filed: Jun. 22, 1981

[51] Int. Cl.³ .......................... B05D 3/00; B05D 3/04
[52] U.S. Cl. .............................. 156/272.6; 156/110 A; 204/164; 204/165; 427/39; 427/327
[58] Field of Search ................ 156/272, 307.5, 307.7, 156/315, 110 A, 272.6; 204/164, 165, 192 E, 192 EC; 428/408, 469; 427/39, 327, 388.1, 399, 409

[56] References Cited

U.S. PATENT DOCUMENTS

| 2,837,458 | 6/1958 | Coleman, Jr. | 428/419 |
| 3,258,388 | 6/1966 | Coleman, Jr. | 156/333 |
| 3,669,825 | 6/1972 | Hall | 156/307.3 |
| 3,799,838 | 3/1974 | Shaw et al. | 428/420 |
| 3,944,709 | 3/1976 | Levy | 428/412 |
| 4,188,273 | 2/1980 | Sano et al. | 204/165 |
| 4,211,824 | 7/1980 | Yoshida | 156/151 |

FOREIGN PATENT DOCUMENTS 55-18548  5/1980  Japan .................... 428/412

OTHER PUBLICATIONS

Schreiber, H. P. et al., "Application of Microwave Plasmas for the Passivation of Metals," *Ind. Eng. Chem. Prod. Res. Dev.*, vol. 17, No. 1, 1978, pp. 27-29.

Schreiber, H. P. et al., "Corrosion Protection by Plasma-Polymerized Coatings", *Thin Solid Films*, 72, (1980), 487-493.

*Primary Examiner*—Edward C. Kimlin
*Assistant Examiner*—F. K. Wine
*Attorney, Agent, or Firm*—J. A. Gazewood

[57] ABSTRACT

Environmental resistance of rubber-metal bonded assemblies is significantly improved by a process comprising treating such substrates in a "low temperature" plasma comprising at least one 1,2-oxirane reactive monomer.

8 Claims, 2 Drawing Figures

METHOD FOR BONDING ELASTOMERS TO METALS

This invention relates to bonding of elastomeric compositions. More particularly, the invention is concerned with methods for bonding natural and synthetic elastomers to metal substrates and the resulting composite structures.

Laminates and composite structures wherein natural and synthetic elastomers are adhesively bonded to metal substrates are well-known articles of commerce. A common problem of such structures is their undesirably poor resistance to hostile environments such as saline conditions and/or high humidity. Under such aggressive conditions, underbond corrosion can begin, leading to the deterioration of the bonded article. To counter the problem, it is a common practice to protect the metal by such techniques as phosphatizing, passivation, galvanizing, tinning, aluminizing, sherardizing, chromizing and other chemical conversion coatings. Such techniques suffer from the disadvantage that they are commonly "wet processes", that is, they are applied from solution, become readily contaminated and provide handling and health hazards. In addition, the use of such processes poses severe environmental waste disposal problems and requires large capital equipment investments to suitably dispose of the chemical wastes resulting from these surface treatments. There is a need for methods of improving environmental resistance of rubber-metal adhesively-bonded assemblies, and particularly for such methods which do not require the disposal of spent treating solutions.

The present invention provides a novel and unobvious method of bonding vulcanizable natural and synthetic rubbers to metal substrates to provide an adhesive bond having an improved resistance to adverse and aggressive environments. More particularly, the bonding method of the present invention generally comprises treating in a reactive monomer gas plasma one or more metal elements, applying an adhesive composition suitable for bonding vulcanizable natural and synthetic rubbers to metal substrates to the plasma-treated surfaces, contacting the adhesively-coated substrate with a vulcanizable natural or synthetic rubber, and subjecting the resultant assembly to conditions of heat and pressure for a time sufficient to effect vulcanization of the rubber composition and curing of the adhesive composition. Broadly, the present invention provides a gas phase plasma coating process wherein there is deposited on the metal substrate an impervious polymeric film. The thin polymeric film exhibits excellent adhesion to the metal and provides a protective primer coating for adhesively bonded products. The deposited coating is compatible with the conventional rubber-metal adhesives to provide bonded articles which are resistant to attack by hostile environments, such as salt spray and water.

FIG. 1 discloses types and properties of known electrical discharges; and

Figure 2:
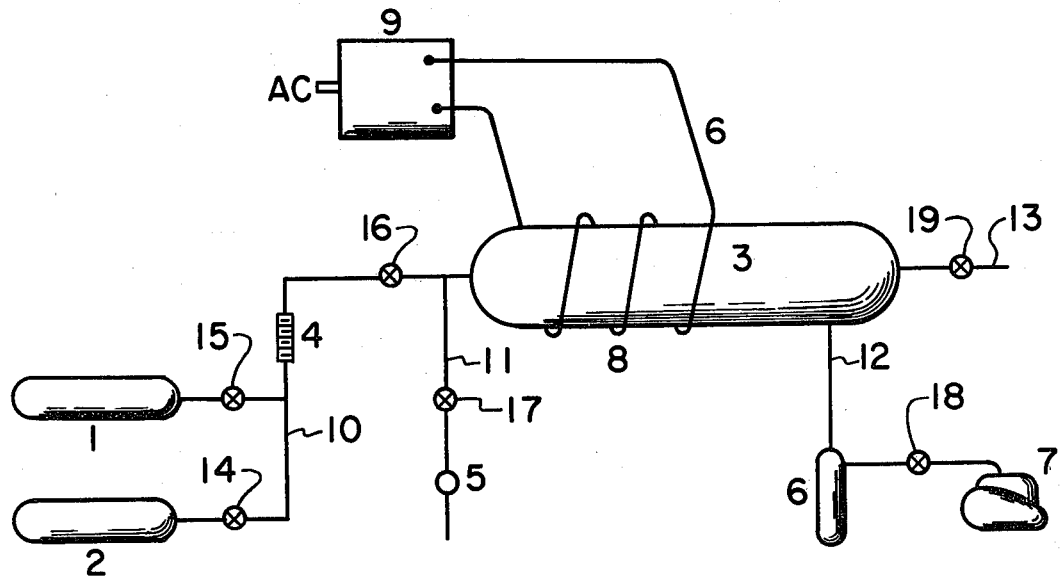

FIG. 2 is a schematic diagram of an apparatus which can be employed in the practice of the invention.

Plasma chemistry deals with chemical reactions which occur in an at least partially ionized gas which is composed of ions, free radicals and neutral fragments. This "fourth state of matter" can be achieved by the action of very high temperatures or strong electrical or magnetic fields. The present invention is concerned with ionized gases produced by an electrical discharge in a gaseous medium. In such a discharge, free electrons gain energy from the applied electrical field and can collide with neutral fragments. In the process, energy is transferred to the neutral particles and leads to a plethora of new specie, including free radicals (molecular specie with unpaired electrons), ions (specie with whole positive or negative charges), atoms and metastables (energetic fragments which are transient and decay to lower energy states). These various specie are available to participate in different chemical and physical processes.

Of the several types of electrical discharges which can create plasmas, see FIG. 1, the present invention utilizes those plasmas generally characterized as glow discharges and which are defined by electron energies of 1-10 eV and electron densities of $10^9$-$10^{12}$ cm$^{-3}$. Additionally, such plasmas lack equilibrium between the electron temperature $T_e$ and the gas temperature $T_g$. Typically, ratios for $T_e/T_g$ lie in the range 10-$10^2$. This lack of thermal equilibrium can provide a plasma in which the gas temperature is near ambient value but in which electron energies are sufficiently high to rupture molecular bonds and kinetically cause other transformations. Depending on the gaseous medium, plasmas may be chemically active, that is, the plasma gas components may become involved in substrate surface reactions, or non-reactive, that is, the plasma gas components do not become involved in such substrate reactions. The non-reactive plasmas are usually regarded as predominately physical processes in which energetic ions, though unable to react chemically with the substrate surface, can impart kinetic energy and momentum to surface atoms or molecules to eject from the surface.

The "low temperature" or non-equilibrium electric glow discharge reactive plasmas which are utilized in the practice of the invention involve coupling radio frequency or microwave power to a discharge zone, with the former being currently preferred. At RF frequencies, either inductive or capacitative types of coupling can be employed. Suitable plasmas can be formed with a radio frequency discharge operated between 0 to 100 megahertz and 1 to 600 watts or with a microwave discharge operated between 400 to 4000 megahertz and 20 to 400 watts. The wattage considerations are based on a five-inch diameter reactor and will vary somewhat with reactor size. The residence or treating period within the reactor zone is generally from 10 minutes to 20 hours, preferably 30 minutes to 2 hours, although residence times outside these limits can often be advantageous.

Substantially any metal substrate, including substrates which have been treated by any known surface treating process such as chemical conversion coatings, nitriding and the like can be treated in accordance with the invention. The methods of the invention are especially suitable for treating metal surfaces which have been otherwise untreated, except for appropriate cleaning, such as degreased, rinsed and/or sand-blasted. Substantially any metal substrate can be treated in accordance with this invention, with ferrous-based metal substrates being preferred.

Metal substrates are prepared for bonding to vulcanizable natural and synthetic rubbers in accordance with this invention by a treatment comprising exposing at least that portion of the metal substrate which is to be subsequently bonded in a zone of electrical glow discharge plasma to a gaseous medium consisting essentially of at least one oxirane monomer in vaporized form. It is critical that the entire portion of the substrate which is to be bonded be entirely within the visible plasma. In a particularly preferred embodiment, the metal elements are exposed to a non-reactive inert gas plasma treatment prior to being exposed to the reactive oxirane monomer plasma.

Substantially any of the known oxirane compounds having a 1,2-oxirane, 2,3-oxirane, 1-3-oxirane or 1,4-oxirane structure, including mixtures of such oxiranes, which is vaporizable at reaction conditions can be employed in forming reactive gas plasmas in accordance with the invention. Representative oxirane compounds include, without limitation thereto, ethylene oxide, propylene oxide, tetrahydrofuran, cyclohexene oxide, 1,4-dihydronaphthalene oxide, styrene oxide, 1,2-butylene oxide, phenyl glycidyl ether, isobutylene oxide, butadiene monoxide, 4-vinylcyclohexene monoxide, epichlorhydrin, cyclopentadiene monoepoxide, 1,3-propylene oxide and 1,4-epoxycyclohexane. The 1,2-oxirane compounds having the formula

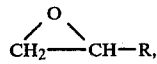

wherein R is selected from the group consisting of hydrogen, halogen, saturated or unsaturated aliphatic group having rom 1 to 8 carbon atoms, saturated or unsaturated cycloaliphatic group having from 4 to 7 ring carbon atoms, and aromatic group having 6, 10 or 14 nuclear carbon atoms, are preferred, with styrene oxide currently being the oxirane monomer of choice.

Non-reactive gas plasmas for use in the preferred embodiments of the invention can be obtained by the ionization of substantially non-reactive, that is, the gaseous ions are substantially non-reactive with the substrate, inert ionization of substantially non-reactive, that is, the gaseous ions are substantially non-reactive with the substrate, inert ionizable gases, such as helium, nitrogen, neon, argon, krypton and xexon, with argon being currently preferred.

Vulcanizable rubbers which can be bonded in accordance with the invention include, without limitation, natural rubber, polychloroprene rubber, styrene/butadiene rubber, ethylene/propylene copolymer rubber (EPM), ethylene/propylene/diene terpolymer rubber (EPDM), butyl rubber and polyurethane rubber.

Metal substrates which have been plasma-treated in accordance with this invention are readily bonded to natural and synthetic rubbers employing any adhesive composition which is known to be suitable for bonding vulcanizable natural and synthetic rubbers to metal substrates. Suitable adhesive compositions include both one-coat and two-coat systems, as these terms are interpreted in the adhesive arts, and are so well-known that a detailed discussion is unnecessary. Exemplary rubber-metal adhesive systems are disclosed in Coleman et al U.S.A. Pat. No. 3,258,388.

The adhesive compositions are applied to the plasma-treated substrates in a conventional manner, such as by dipping, spraying or brushing. Preferably, the applied adhesive film, whether comprising a single-coat or a two-or-more coat adhesive system, is allowed to dry before being contacted with the vulcanizable rubber composition. Subsequent to forming the rubber-metal assembly, with the adhesive disposed between the rubber and metal, the assembly is cured by heating in accordance with conventional practices. The exact conditions will depend on the particular elastomer being bonded and the adhesive system which is employed, and will generally be at a temperature in the range from 120° C. to 200° C. for from 5 to 75 minutes.

The invention will be more fully described with reference to FIG. 2, which is a schematic diagram of an apparatus which can be employed in the practice of the invention.

As shown in FIG. 2, there are provided non-reactive gas 1 and reactive monomer reservoir 2 with conduit means to deliver either or both non-reactive gas and reactive monomer to reactor 3. A flowmeter 4 is provided for measuring gas flow rates and a vacuum gauge 5 is provided in conduit 11 to monitor the pressure within the reactor system. Valves 14, 15, 16 and 17 are provided in conduits 10 and 11 to regulate the flow rate of non-reactive and reactive monomer materials to reactor 3. Prior to use, reactor 3 is evacuated by opening valve 18 to vacuum source 7. A suitable helical coil 8 is connected to a suitable radio frequency oscillator 9, which can be operated at a frequency in the range from 0 to 100 megahertz. Substrates to be treated in accordance with the invention are placed on an appropriate rack, not shown, in a staggered configuration and disposed within the reaction zone. The bond surface area of the substrates must be located entirely within the visible plasma region. The reactor system also includes a trap 6 and vent conduit 13 and its valve 19.

The following example is provided to illustrate the invention. It is understood that the Example is not to be construed to unduly limit the invention.

EXAMPLE

Cold-rolled steel elements are solvent-degreased in trichloroethylene and grit-blasted to clean the exposed surface of contaminants and loose scale. The cleaned elements are placed in the plasma reaction zone and arranged in a staggered configuration with all elements being located within the boundaries defined by the helical coil. The reaction chamber is pumped down to a vacuum of 20–25 microns Hg and argon is allowed to flow through the chamber at a pressure of 1000 microns H. A plasma is initiated by radio frequency discharge at a power of 50 watts and a frequency of 13.5 megahertz. The steel elements are exposed to the argon plasma for 60 minutes. The argon plasma is terminated and the plasma chamber is again evacuated to a pressure of 20–25 microns H. The vaporized reactive monomer styrene oxide is introduced into the plasma reaction zone at a pressure of 17–40 microns H. The plasma is activated by radio frequency discharge at a power of 25 watts and a frequency of 13.5 megahertz. The steel surfaces are exposed to the styrene oxide plasma for 4½ hours, the plasma is terminated and the plasma reaction zone is purged with nitrogen. The steel elements are coated following the styrene oxide plasma deposition with a very thin film as evidenced by a "rainbow" pattern on the surface.

The plasma-treated metal elements are prepared for bonding to vulcanizable natural rubber stock by dipping in an inert organic solvent-based heat reactive phenolic primer. After evaporation of the inert organic solvent, the primed metal elements are dipped in an inert organic solvent-based chlorinated rubber rubber-metal adhesive. After evaporation of the inert organic solvent, the adhesively-coated metal elements are bonded to a sulfur-curable vulcanizable natural rubber composition at a temperature of 150° C. for 20 minutes. The bonded assemblies are tested for primary adhesion and corrosion resistance after exposure for 30 days to 5% salt spray in accordance with ASTM D429, Method B, modified to 45°. The results are reported in the following Table and compared to non-plasma-treated control bonded assemblies.

TABLE

| Treatment | Adhesion Not Exposed to Salt Spray | | Adhesion Exposed to Salt Spray | |
|---|---|---|---|---|
| | lbs./ linear in. | Failure | lbs./ linear in. | Failure |
| Styrene oxide plasma | 72 | 100 R | 61 | 90R, 10M |
| Grit-blasted, no plasma | 60 | 100 R | 53 | 20R, 80M |
| Zinc phospatized, no plasma | 66 | 100 R | 103 | 100R |

The data demonstrate that the treatment of metal substrates in accordance with this invention is effective to improve environmental resistance with no deleterious effect on adhesion.

What is claimed is:

1. A method for bonding vulcanizable natural and synthetic rubbers to metal substrates comprising
   (a) exposing at least one metal element to a glow discharge plasma consisting essentially of a gaseous oxirane reactive monomer;
   (b) applying to at least one plasma-exposed surface of said metal element an adhesive composition suitable for bonding natural and synthetic rubber to metal;
   (c) contacting said adhesively-coated metal element with a vulcanizable rubber composition; and
   (d) subjecting the resultant assembly to conditions sufficient to vulcanize said rubber and cure said adhesive.

2. A method according to claim 1 wherein said reactive monomer comprises styrene oxide.

3. A method according to claim 1 for bonding vulcanizable natural and synthetic rubbers to metal substrates comprising:
   (a) exposing at least one metal element to a glow discharge plasma consisting essentially of a non-reactive gas;
   (b) exposing at least one of said non-reactive gas-plasma-exposed substrates to a glow discharge plasma consisting essentially of a gaseous oxirane reactive monomer;
   (c) applying to at least one reactive monomer plasma-exposed surface of said metal element an adhesive composition suitable for bonding natural and synthetic rubber to metal;
   (d) contacting said adhesively-coated metal element with a vulcanizable rubber composition; and
   (e) subjecting the resultant assembly to conditions sufficient to vulcanize said rubber composition and cure said adhesive.

4. A method according to claim 3 wherein said reactive monomer comprises styrene oxide.

5. A method according to claim 3 wherein said non-reactive gas is selected from the group consisting of helium, nitrogen, neon, argon, krypton and xenon.

6. A method according to claim 5 wherein said reactive monomer comprises styrene oxide.

7. A method according to claim 3 wherein said non-reactive gas comprises argon.

8. A method according to claim 7 wherein said reactive monomer comprises styrene oxide.

* * * * *